(12) United States Patent
Liu

(10) Patent No.: US 9,043,408 B2
(45) Date of Patent: May 26, 2015

(54) APPARATUSES AND METHODS FOR IDENTIFYING EMAIL AND EMAIL SERVERS

(75) Inventor: Jie Liu, Wuhan (CN)

(73) Assignee: Iyuko Services L.L.C., Dover, DE (US)

( * ) Notice: Subject to any disclaimer, the term of this patent is extended or adjusted under 35 U.S.C. 154(b) by 819 days.

(21) Appl. No.: 12/649,797

(22) Filed: Dec. 30, 2009

(65) Prior Publication Data

US 2011/0161433 A1  Jun. 30, 2011

(51) Int. Cl.
*G06Q 10/10* (2012.01)
*H04L 12/58* (2006.01)
*H04L 29/06* (2006.01)

(52) U.S. Cl.
CPC ............ *G06Q 10/107* (2013.01); *H04L 12/585* (2013.01); *H04L 12/5885* (2013.01); *H04L 51/12* (2013.01); *H04L 63/1408* (2013.01)

(58) Field of Classification Search
None
See application file for complete search history.

(56) References Cited

U.S. PATENT DOCUMENTS

| | | | |
|---|---|---|---|
| 7,996,406 B1 * | 8/2011 | Rajan et al. | 707/739 |
| 2006/0047769 A1 * | 3/2006 | Davis et al. | 709/207 |
| 2006/0242243 A1 * | 10/2006 | Matsumoto | 709/206 |

\* cited by examiner

*Primary Examiner* — Scott B Christensen
(74) *Attorney, Agent, or Firm* — Meyertons, Hood, Kivlin, Kowert & Goetzel, P.C.

(57) ABSTRACT

A message body carried by an Internet Protocol (IP) packet is identified; the message body is searched for features of an email message; and a result of the search is used to determine if the IP packet is associated with email. The features of an email message include multiple words usually associated with email messages.

13 Claims, 4 Drawing Sheets

```
┌─────────────────────────────────────────────┐  ⎤ 402
│ IDENTIFY AN IP PACKET AS BEING ASSOCIATED WITH EMAIL │
└─────────────────────────────────────────────┘
```

```
┌─────────────────────────────────────────────┐  ⎤ 404
│ LOCATE A COUNT ASSOCIATED WITH A SOURCE IP ADDRESS │
│            CARRIED BY THE IP PACKET          │
└─────────────────────────────────────────────┘
```

```
┌─────────────────────────────────────────────┐  ⎤ 406
│               UPDATE THE COUNT              │
└─────────────────────────────────────────────┘
```

```
┌─────────────────────────────────────────────┐  ⎤ 408
│ IDENTIFY AN ELECTRONIC DEVICE AT THE SOURCE IP │
│ ADDRESS AS AN EMAIL SERVER IF THE COUNT REACHES A │
│                 THRESHOLD VALUE             │
└─────────────────────────────────────────────┘
```

APPARATUSES AND METHODS FOR IDENTIFYING EMAIL AND EMAIL SERVERS

BACKGROUND

Email has become a popular communication tool in daily life. Every day, large numbers of emails are sent through the Internet. While email brings much convenience to daily life, some emails, such as junk emails, are bothersome. In addition to junk emails, some emails are not allowed to enter a private network for security reasons. Typically, network security equipment coupled between the Internet and a private network is used to screen emails and email servers.

There are mainly four protocol used for sending or receiving email in the application layer of the Internet: Simple Mail Transfer Protocol (SMTP), Post Office Protocol (POP), Internet Mail Access Protocol (IMAP), and Hypertext Transfer Protocol (HTTP). Each protocol uses a fixed port to communicate with the transport layer of the Internet. SMTP, POP, IMAP, and HTTP use ports 25, 110, 143, and 80, respectively. SMTP, POP, and IMAP are known as typical email protocols, and are used by stand-alone email clients, such as Microsoft Outlook® and Outlook Express®. HTTP, which is an untypical email protocol, sends email as a webpage, and is used by free email services such as Hotmail® and Yahoo®.

One method commonly used in network security equipment to identify email is to analyze the Internet Protocol (IP) packet to access a source port number carried by the IP packet. The source port number can be used to identify emails sent using a typical email protocol. However, emails sent using HTTP may not be identified as emails. Instead, these mails are characterized as an ordinary webpage. Thus, junk emails which are often sent from mail servers may not be identified.

SUMMARY

In one embodiment, a message body carried by an Internet Protocol (IP) packet is identified; the message body is searched for features of an email message; and a result of the search is used to determine if the IP packet is associated with email. The features of an email message include multiple words usually associated with email messages.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Figure 1:
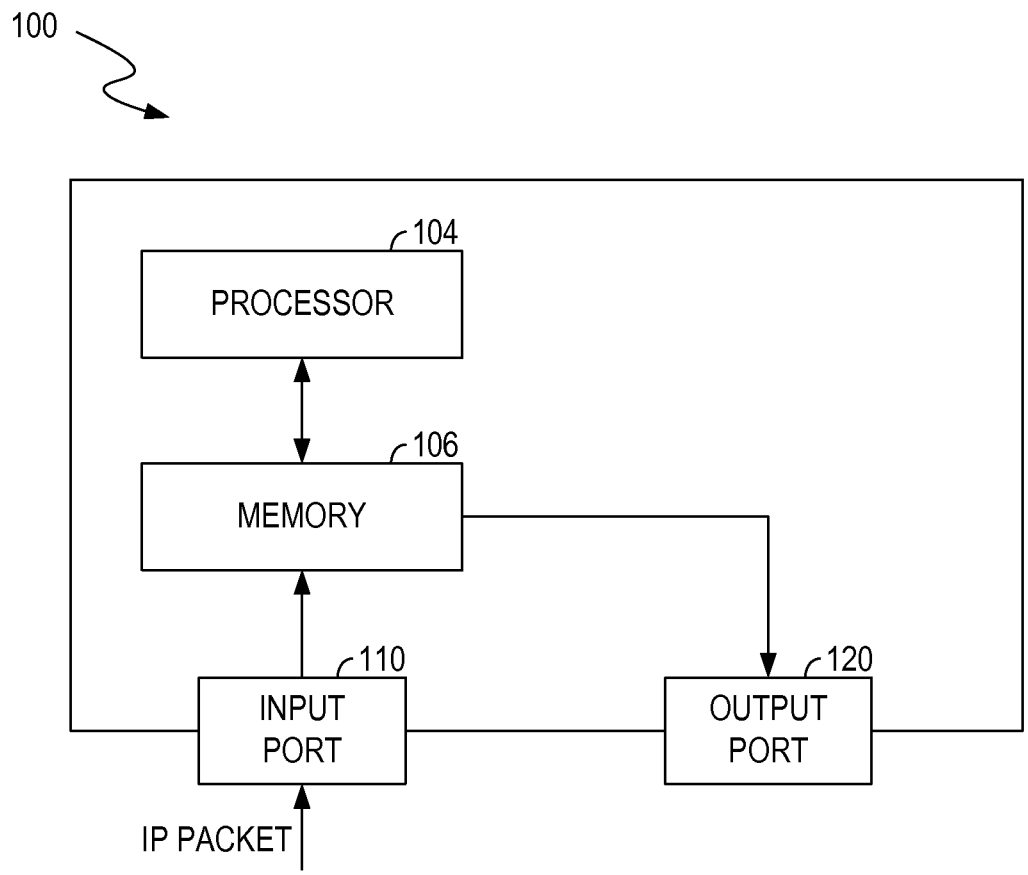
FIG. 1 shows an apparatus for identifying an email or an email server according to one embodiment of the present invention.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "determining," "locating," "updating," "identifying," "accessing," "searching," "associating," "sorting" or the like, refer to the actions and processes (e.g., the flowcharts of FIGS. 3 and 4) of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

FIG. 1 shows an apparatus 100 for identifying email or an email server according to one embodiment of the present invention. In the example of FIG. 1, the apparatus 100 includes an input port 110, an output port 120, a processor 104, and a memory 106. The memory 106 stores programs and data. The processor 104 executes operations which are defined by the programs stored in the memory 106. In one embodiment, the apparatus 100 is a network security apparatus, such as a Layer 3 (L3) gateway.

In one embodiment, the apparatus 100 can be coupled to the Internet (not shown in FIG. 1) and a private network (e.g., an intranet, also not shown in FIG. 1). The apparatus 100 receives Internet Protocol (IP) packets at the input port 110 from the Internet, determines which of those packets are allowed to access the private network, and outputs the IP packets that are allowed to access the private network at the output port 120.

Figure 2:
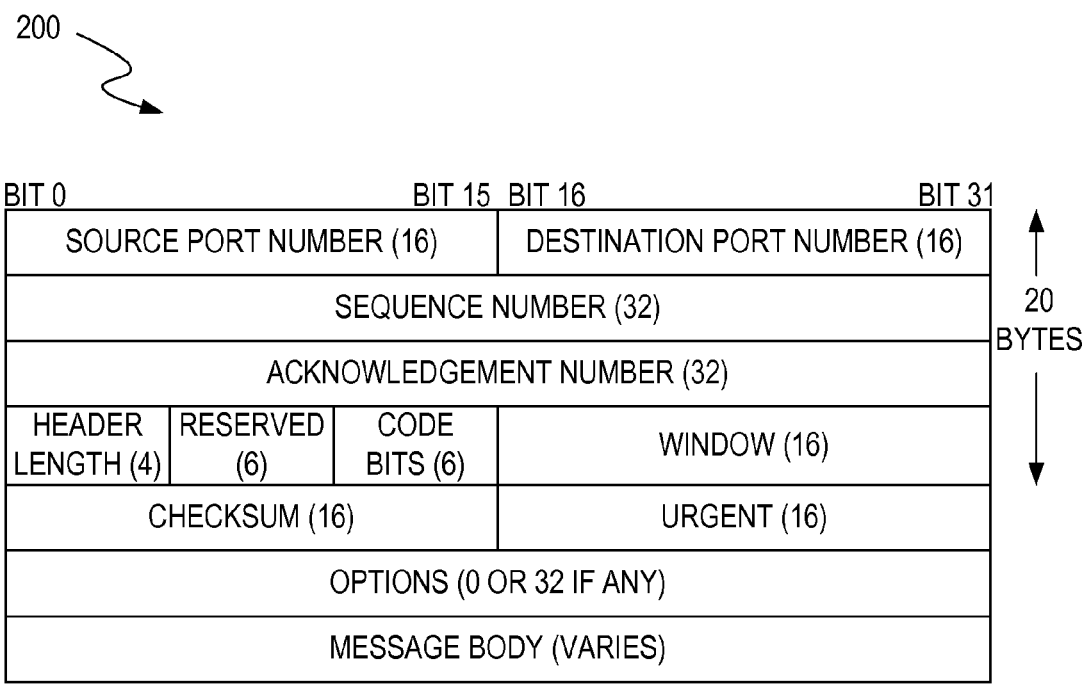
FIG. 2 shows a structure of a Transmission Control Protocol segment.

A description of the IP packet is given here. Transmission Control Protocol (TCP)/IP is a stack of protocols for transmitting data through the Internet and includes four layers: application layer, transport layer, network layer, and data link layer. Once a TCP communication is established, a message body (data) that directs to a destination IP address is transmitted from the application layer to the transport layer. In the transport layer, the message body is packed into TCP segments and the TCP segments are transmitted to the network layer. FIG. 2 shows a structure of a TCP segment 200. In the network layer, the TCP segments are packed into multiple groups. After a source IP address, a destination IP address, and control information are added to each group to form an IP packet, the IP packet is transmitted to the destination IP address. Therefore, after each IP packet comes into the apparatus 100, the processor 104 can analyze the IP packet to identify (read) the source port number, the message body, and the source IP address carried by the IP packet, in one embodiment.

Advantageously, the processor 104 can identify emails sent using an untypical email protocol (e.g., HTTP) in a manner such as that described below. Furthermore, the processor 104 can identify emails sent from an email server. Moreover, the processor 104 can block some emails from accessing the private network according to the operating scheme described below.

The processor 104 determines if an IP packet is associated with an email message based on the source port number in the packet, in one embodiment. The processor 104 checks the source port number to determine if the IP packet is sent using a typical email protocol (e.g., it contains a source port number that is 25, 110, or 143). Thus, the processor 104 can directly identify the IP packet as email if the IP packet is sent using a typical email protocol. Otherwise, the processor 104 can search the message body carried by the IP packet for features of an email message and determine if the IP packet is associated with an email message.

More specifically, the features of an email message include words that are typically used in an email message, such as "subject," "RE," "FW," "@," "sender," and "receiver." Each feature of an email message can be sorted into one of several types, in one embodiment. Those types can include, for example, receiver's feature, sender's feature, subject's feature, text's feature, and attach file's feature. Each type includes a group of particular words. For example, the receiver's feature can include "receiver," "receiver box," and "@." The sender's feature can include "sender," "send box," and "@." The subject's feature can include "subject," "FW," and "RE." The text's feature can include "hi" and "hello." The attach file's feature can include "attach" and "file." These words and other examples of such words are referred to as keywords in the discussion below.

The processor 104 searches the message body for features of an email message and a count is used to indicate a result of the search. In one embodiment, the aforementioned count is updated based on a "types of keywords" scheme. More specifically, if one of the types of keywords mentioned above is found in the message body of an IP packet, then the processor 104 can conclude that the IP packet has the corresponding feature. For example, the IP packet has the subject's feature if the word "RE" is found in the message body carried by the IP packet. The count is updated (incremented) if any one of the keywords associated with a particular feature type is found in the message body. In other words, the count indicates the number of feature types that the IP packet has. If the count reaches a threshold value, the processor 104 can conclude that the IP packet is associated with an email message.

In another embodiment, the aforementioned count is updated based on a "keywords" scheme. More specifically, the count is updated (incremented) if a keyword is found in the message body. In one embodiment, the count is incremented by one for each keyword found; if five keywords are found in the message body, for example, then the count is incremented by five. If the count reaches a threshold value, the processor 104 can conclude that the IP packet is associated with an email message. In other words, the value of the aforementioned count indicates the probability that the IP packet is associated with email—the higher the values, the greater the probability. This embodiment, in which keywords are counted, and the preceding embodiment, in which types of keywords are counted, can be used in combination or separately.

In one embodiment, after an IP packet is identified as being associated with email, the processor 104 can further analyze the message body of the IP packet to obtain more keywords. Thus, the accuracy of identifying email can be improved.

Therefore, the processor 104 can identify email sent using an untypical email protocol (e.g., HTTP). Furthermore, the processor 104 can identify emails sent from an email server in the manner described below.

To identify emails sent from an email server, counts are stored in the memory 106 and can be accessed by the processor 104. The counts are sorted by source IP address; that is, for the IP packets that are identified as being associated with email and that carry the same source IP address, there are associated counts. In other words, there is a count per source IP address.

In one embodiment, after processor 104 identifies an IP packet as being associated with email, the processor 104 uses the source IP address carried by the IP packet to locate a count associated with that IP address in the memory 106, and then updates (increments) the count. If the updated count reaches a threshold value during a specified time period, the processor 104 can identify the electronic device at the source IP address as an email server.

The processor 104 can block some emails from accessing a private network according to the operating scheme described above. In one embodiment, the operating scheme can block emails containing "unwelcome" information that are not allowed to enter the private network. In this embodiment, the processor 104 can search the message body of an IP packet that is identified as being associated with email to determine if it contains "unwelcome" information. More specifically, some "unwelcome" words are stored in the memory 106, and the processor 104 searches these words in the message body and can block the IP packet if one of the "unwelcome" words is found in that IP packet. In another embodiment, the operating scheme can be used to block emails sent from an email server at a particular IP address. In this instance, if the processor 104 identifies an IP packet as being associated with email and the source IP address carried by the IP packet is equal to the particular IP address, the processor 104 blocks the IP packet from entering the private network. Therefore, for example, junk emails sent from an email server cannot enter the private network.

The threshold values mentioned above used for identifying emails and email servers can be adjusted. For example, the threshold value used for identifying IP packets as being associated with emails can be set to a higher value to improve accuracy.

Figure 3:
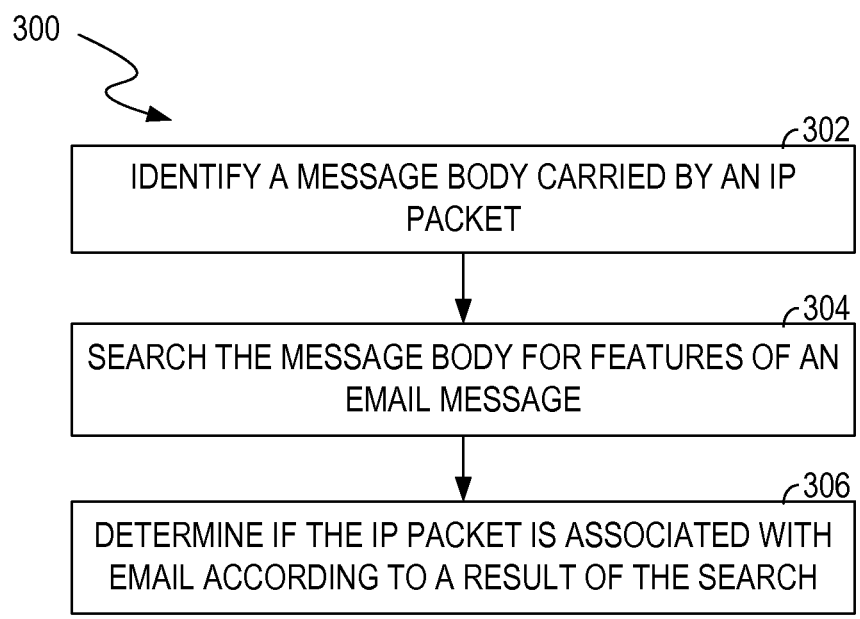
FIG. 3 shows a flowchart of a method for identifying an email according to one embodiment of the present invention.

FIG. 3 shows a flowchart 300 of a method for identifying email according to one embodiment of the present invention. FIG. 3 is described in combination with FIG. 1.

At 302, a message body carried by an IP packet is identified by the processor 104. In one embodiment, after an IP packet comes into the apparatus 100, the processor 104 analyzes the IP packet to identify (read) the source port number, the source IP address, and the message body carried by the IP packet. The processor 104 firstly determines if the IP packet is an email packet based on the source port number as described in FIG. 1. If the IP packet is sent using a typical email protocol, the processor 104 identifies the IP packet as email. Otherwise, at 304, the processor 104 searches the features in the message body to find keywords that are used in a typical email message. Examples of such keywords are presented above.

At 306, the processor 104 determines if the IP packet is associated with email according to a result of the search. In one embodiment, a count is used to indicate the probability that the IP packet is associated with email. The count is updated according to results of the search as described above in conjunction with FIG. 1. The processor 104 identifies the IP packet as being associated with email if the updated count reaches a threshold value.

Figure 4:
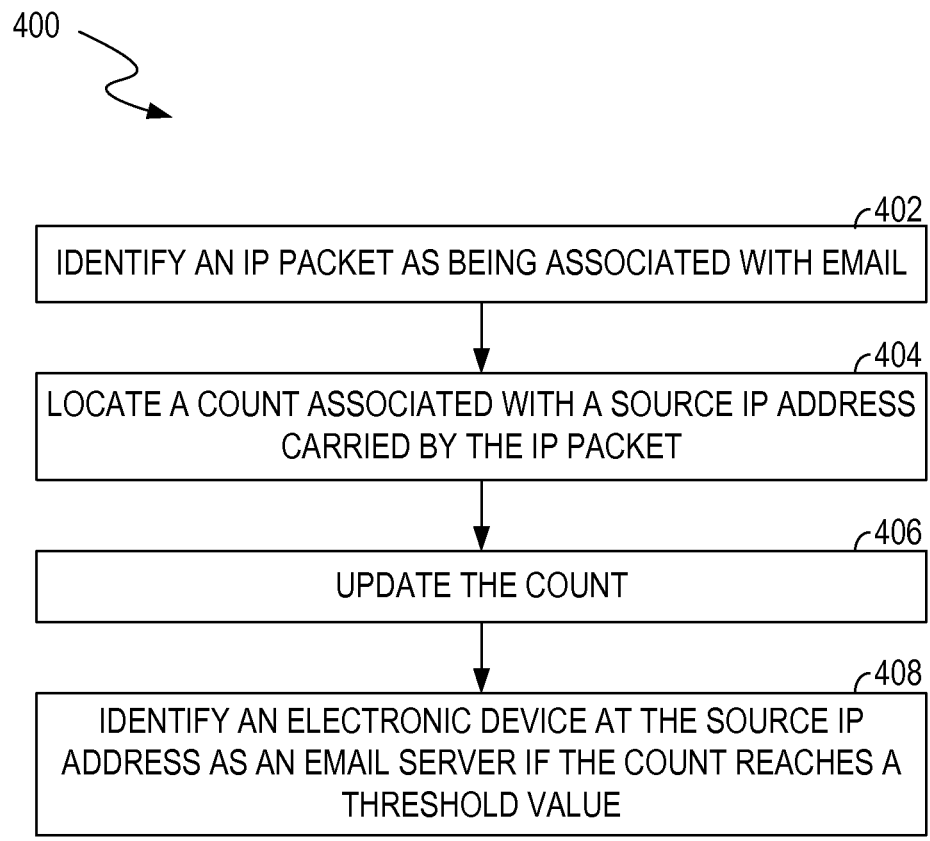
FIG. 4 shows a flowchart of a method for identifying an email server according to one embodiment of the present invention.

FIG. 4 shows a flowchart 400 of a method for identifying an email server according to one embodiment of the present invention. FIG. 4 is described in combination with FIG. 1.

At 402, an IP packet is identified as being associated with email. At 404, a count associated with the source IP address carried by the IP packet is located in the memory 106. In one embodiment, counts are stored in the memory 106 and each count is used to indicate the number of IP packets that have the same source IP address and are identified as being associated with email during a specified time period.

At 406, the located count is updated (incremented). At 408, the electronic device at the source IP address is identified as an email server if the count reaches a threshold value.

To summarize, in conventional methods, whether an IP packet is associated with email or not is based on whether the IP packet is sent using a typical email protocol (e.g., the SMTP, the POP3, or the IMAP4); thus, IP packets sent using untypical email protocols (e.g., the HTTP) may not be identified. According to embodiments of the present invention, an IP packet sent using an untypical email protocol can be identified as email based on the features of the IP packet. Relative to conventional methods, emails sent using untypical email protocols can be identified.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A non-transitory computer readable medium having program instructions stored thereon that are executable to cause a computer system to perform a method comprising:
    examining a plurality of Internet Protocol (IP) packets from a plurality of source IP addresses to determine whether the IP packets include email content, wherein the examining includes, for each given IP packet in the plurality of IP packets:
        searching the given IP packet for keywords indicative of email content;
        maintaining a first count value based on a number of the keywords present in the given IP packet; and
        based on the first count value reaching a first threshold value, determining that the given IP packet includes email content;
    maintaining a plurality of second count value, each associated with a respective one of the plurality of source IP addresses, wherein each of the plurality of second count value specifies a number of packets from a source IP address that are determined to include email content based on the examining;
    identifying a source IP address of the plurality of source IP addresses as being associated with a source of email traffic based on the second count value reaching a second threshold value; and
    filtering traffic from the identified source IP address as email traffic.

2. The computer readable medium of claim 1, wherein the filtering includes blocking traffic from the source IP address responsive to the identifying; and
    wherein the program instructions are executable to examine IP packets directed to port numbers for non-email protocols.

3. The computer readable medium of claim 2, wherein the IP packets include packets directed to a port for the Hypertext Transfer Protocol (HTTP).

4. The computer readable medium of claim 1, wherein the keywords include one or more of the following: "subject," "RE," "FW," "@," "sender," "hi," "hello," "attach," "file," "sender box," "receiver," and "receiver box."

5. The computer readable medium of claim 1, wherein the examining includes:

based on the first count value of the given IP packet reaching the first threshold value, analyzing the given packet for additional keywords indicative of email content; and searching another IP packet for the additional keywords.

6. The computer readable medium of claim 1, wherein the method further comprises:

prior to the examining, determining whether IP packets from the plurality of source IP addresses specify a source port for a Simple Mail Transfer Protocol (SMTP); and wherein the examining is of IP packets determined to not specify the source port.

7. A method comprising:

a computer system receiving packets from a plurality of Internet Protocol (IP) addresses;

the computer system searching the received packets for keywords indicative of email content;

based on the searching, the computer system updating a first set of count values, wherein each count value in the first set identifies a number of keywords present in a respective one of the packets;

the computer system maintaining, based on the first set of count values, a second set of count values, wherein each count value in the second set identifies a number of packets determined to include email content received from a respective one of the plurality of IP addresses;

the computer system identifying ones of the plurality of IP addresses as being associated with email traffic based on count values in the second set reaching a threshold value, wherein the count values correspond to the IP addresses; and the computer system blocking traffic from the identified IP addresses as email traffic.

8. The method of claim 7, wherein the packets determined to include email content include packets directed to a Hypertext Transfer Protocol (HTTP) port.

9. The method of claim 7, further comprising:

based on the first set of count values reaching a threshold value, the computer system examining one or more of the received packets to identify keywords indicative of email content; and the computer system determining, based on the identified keywords, that a received one of the packets includes email content.

10. A method comprising:

a computer system determining whether packets from a plurality of Internet Protocol (IP) addresses include email content, wherein the determining includes, for each of the packets:

maintaining a first count value for the packet, wherein the first count value specifies a number of keywords present in the packet, wherein the keywords are indicative of email content; and determining that the packet includes email content based on the first count value reaching a first threshold value;

the computer system maintaining a plurality of second count values, each associated with a respective one of the plurality of IP addresses, wherein each of the plurality of second count values specifies a number of packets from an IP address that are determined to include email content;

the computer system identifying IP addresses as being associated with email traffic based on ones of the plurality of second count values reaching a second threshold value; and the computer system filtering traffic from the identified IP addresses as email traffic.

11. The method of claim 10, further comprising:

based on the first count value reaching the first threshold value, analyzing a body of a packet to determine keywords associated with email content; and updating a count value for another packet based on the other packet including one or more of the determined keywords.

12. The method of claim 10, wherein the packets do not include packets from Transmission Control Protocol (TCP) port numbers 25, 110, or 143.

13. The method of claim 10, wherein the filtering includes the computer system blocking traffic from the identified IP address.

\* \* \* \* \*